Patented Dec. 11, 1934

1,984,334

UNITED STATES PATENT OFFICE 1,984,334

MANUFACTURE OF ALCOHOLS

Louis A. Clarke, Fishkill, N. Y., and Leon W. Cook, Roselle, N. J., assignors to The Texas Company, New York, N. Y., a corporation of Delaware No Drawing. Application May 20, 1933
Serial No. 672,041

12 Claims. (Cl. 260—156)

This invention relates to the manufacture of alcohols and has to do particularly with the preparation of alcohols from halogen derivatives of hydrocarbons, containing an alkyl group to which the halogen is attached, by treating the halogen compound with the lower valency hydroxides of certain metals; the invention also comprises a novel process of treating halogen derivatives of hydrocarbons with hydrolyzing agents while in the presence of an organic reducing material.

The compounds which may be treated, according to the invention, may include the halogen derivatives of aliphatic hydrocarbons, unsaturated or saturated, or derivatives thereof containing one or more alkyl or aryl substituents. We prefer to use the halogen derivatives of the lower members of the paraffin series, such as propyl chloride, butyl chloride, etc., although the higher members, such as octyl chloride and above, may be used.

In accordance with the invention we treat the chlorhydrocarbons with an alkaline hydrolyzing agent. The bivalent hydroxides of the metals of variable valence of the zinc group, consisting of ferrous, cobaltous, nickelous and manganous hydroxides (Elements of Qualitative Chemical Analysis, by Julius Stieglitz, vol. II, 1911, page 30) comprise suitable materials for this purpose. The treatment comprises heating and agitating a mixture of the chlorhydrocarbons with a water suspension of the hydroxide in an autoclave or other suitable apparatus capable of withstanding pressure. The mixture is heated, while the vapors are all or in part confined, to temperatures of 50°–250° C. and preferably 75°–150° C. The time of the reaction may range from 2–10 hours and preferably about 3–5 hours. The pressure may be maintained from about 50–500 lbs. and preferably about 200–400 lbs. The conditions of treatment obviously will vary, depending on the reagents and the chlorhydrocarbons treated, but we have found that conditions within the limits specified give the desired results.

The treatment as outlined above may be carried out to advantage in the presence of organic reducing agents and this feature is intended as a part of the invention. We have found that if the hydrolysis is conducted in the presence of organic reducing agents, the operation is facilitated and the yield of the desired products is increased remarkably. The organic reducing agents which may be used comprise certain polyhydroxybenzene compounds, such as pyrogallol, pyrocatechol, and derivatives thereof; aromatic amines, such as ortho- and para-phenylenediamine, alpha-naphthylamine, diaminonaphthalenes, and their derivatives; and aminophenols, such as ortho- and para-aminophenol, 1-amino-2-naphthol, and their derivatives. The compounds that are useful include also certain hydroxynaphthalenes, such as alpha- and beta-naphthol. The quantity of the organic reducing agent used may range from about 0.5 to 5% of the weight of the organic chloride employed, and preferably around 1–2%.

In the operation of the invention, octyl chloride was mixed with an excess of ferrous hydroxide, the quantities used being in about the ratio of one mol of the chloride to one mol of the hydroxide, and the latter was in the form of a water suspension of freshly precipitated ferrous hydroxide. The mixture was heated for two hours at about 210° C. in an autoclave. The pressure generated was about 350 lbs. gauge. The yield of alcohol in the reaction products was about 25% of the theoretical.

As another example of the operation of the invention, amyl chloride and ferrous hydroxide were mixed in about the same proportions as in the above example and the mixture heated for four hours at 150° C. in the presence of pyrogallol, the pyrogallol being present in an amount equal to about 1% by weight of the chloride. The yield of alcohol from the products of reaction was approximately 60% of the theoretical.

Obviously many modifications and variations of the invention, as hereinbefore set forth, may be made without departing from the spirit and scope thereof, and therefore only such limitations should be imposed as are indicated in the appended claims.

We claim:

1. The process for the preparation of alcohols which comprises treating a halogen derivative of a hydrocarbon, containing an alkyl group to which the halogen is attached, with a bivalent hydroxide of a metal of variable valence of the zinc group.

2. The process according to claim 1 in which the bivalent hydroxide is ferrous hydroxide.

3. The process for the preparation of alcohols which comprises treating a halogen derivative of a hydrocarbon, containing an alkyl group to which the halogen is attached, with a hydroxide of a metal of the zinc group while in the presence of an organic reducing agent.

4. The process according to claim 3 in which the organic reducing agent is a polyhydroxy benzene compound.

5. The process according to claim 3 in which the organic reducing agent is an aromatic amino compound.

6. The process according to claim 3 in which the organic reducing agent is an aminophenol compound.

7. The process for the preparation of alcohols which comprises treating a halogen derivative of a hydrocarbon, containing an alkyl group to which the halogen is attached, with a bivalent hydroxide of a metal of the zinc group while in the presence of an organic reducing agent.

8. The process for the preparation of alcohols which comprises treating a halogen derivative of an aliphatic hydrocarbon with a bivalent hydroxide of a metal of the zinc group while in the presence of pyrogallol.

9. The process for the preparation of alcohols which comprises treating a halogen derivative of an aliphatic hydrocarbon with a bivalent hydroxide of a metal of the zinc group while in the presence of para-aminophenol.

10. The process for the preparation of alcohols which comprises treating a halogen derivative of an aliphatic hydrocarbon with a bivalent hydroxide of a metal of the zinc group while in the presence of para-phenylenediamine.

11. The process for the preparation of alcohols which comprises heating a halogen derivative of a hydrocarbon of the paraffin series with ferrous hydroxide while in the presence of an organic reducing agent.

12. The process for the preparation of amyl alcohol which comprises treating amyl chloride with ferrous hydroxide at a temperature of 75°–150° C. while in the presence of pyrogallol.

LOUIS A. CLARKE.
LEON W. COOK.